United States Patent
Budhiraja et al.

(10) Patent No.: US 12,494,985 B2
(45) Date of Patent: Dec. 9, 2025

(54) OPTIMIZED MULTICAST TRANSPORT MIGRATION PROCEDURES

(71) Applicant: Cisco Technology, Inc., San Jose, CA (US)

(72) Inventors: Anuj Budhiraja, San Jose, CA (US); Mankamana Prasad Mishra, San Jose, CA (US); Rishabh Parekh, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/440,376

(22) Filed: Feb. 13, 2024

(65) Prior Publication Data
US 2025/0260638 A1    Aug. 14, 2025

(51) Int. Cl.
*H04L 45/02* (2022.01)
*H04L 45/52* (2022.01)

(52) U.S. Cl.
CPC ............ *H04L 45/04* (2013.01); *H04L 45/06* (2013.01); *H04L 45/52* (2013.01)

(58) Field of Classification Search
CPC .......... H04L 45/04; H04L 45/06; H04L 45/52
See application file for complete search history.

(56) References Cited

U.S. PATENT DOCUMENTS

| | | | |
|---|---|---|---|
| 10,833,880 B2 | 11/2020 | Kotalwar et al. | |
| 2011/0188499 A1 | 8/2011 | Wijnands et al. | |
| 2021/0014159 A1 | 1/2021 | Mishra et al. | |
| 2021/0067463 A1* | 3/2021 | Mukhopadhyay | H04L 45/04 |
| 2022/0124186 A1* | 4/2022 | Dutta | H04L 69/40 |

(Continued)

FOREIGN PATENT DOCUMENTS

| CN | 109981308 B | * | 5/2022 |
|---|---|---|---|
| CN | 114726783 A | | 7/2022 |

OTHER PUBLICATIONS

N. Zhang, M. A. Sirbu and J. M. Peha, "A comparison of migration and multihoming support in IPV6 and XIA, " 2017 International Symposium on Networks, Computers and Communications (ISNCC), Marrakech, Morocco, 2017, pp. 1-8 (Year: 2017).*

(Continued)

*Primary Examiner* — Messeret F Gebre
(74) *Attorney, Agent, or Firm* — Polsinelli P.C.

(57) ABSTRACT

The present technology provides solutions for optimizing communications between nodes and can include receiving, by a first node from a second node, an advertisement indicating an advertisement transport protocol supported by the second node, where the first node supports a plurality of transport protocols, and the advertisement transport protocol is one of the plurality of transport protocols, where the first node and the second node are nodes of a border gateway protocol (BGP) community, receiving, by the first node, from a requesting node a request to join the BGP community, where the request includes an attribute indicating a request transport protocol supported by the requesting node, allocating, by the first node and based on the attribute, a resource for the request transport protocol supported by the requesting node, and providing, by the first node, a notification to the second node indicating allocation of the resource for the request transport protocol.

20 Claims, 4 Drawing Sheets

(56) References Cited

U.S. PATENT DOCUMENTS

2023/0269168 A1\* 8/2023 Yang ................... H04L 69/164
2023/0308386 A1   9/2023 Duan et al.

OTHER PUBLICATIONS

K. A. Noghani, A. Kassler and P. S. Gopannan, "EVPN/SDN Assisted Live VM Migration between Geo-Distributed Data Centers," 2018 4th IEEE Conference on Network Softwarization and Workshops (NetSoft), Montreal, QC, Canada, 2018, pp. 105-113, doi: 10.1109/NETSOFT.2018.8459946. (Year: 2018).\*

\* cited by examiner

OPTIMIZED MULTICAST TRANSPORT MIGRATION PROCEDURES

TECHNICAL FIELD

The present technology relates to multicast transport migration procedures, and more particularly to a network configured with multiple nodes supporting a plurality of transport protocols to multicast across the plurality of transport protocols.

BACKGROUND

Historically, networks mainly utilized one transport protocol for multicasting and unicasting. For example, Generic Routing Encapsulation (GRE) has been used for decades. Multicasting is a form of group communication where data transmission is simultaneously sent to a group of destinations, such as receivers, nodes, computers, among others. Multicast can be a one-to-many or many-to-many distribution. For example, multicast is employed in applications of streaming media.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

OVERVIEW

In at least one aspect, a method for optimizing communications, the method includes receiving, by a first node from a second node, an advertisement indicating an advertisement transport protocol supported by the second node, where the first node supports a plurality of transport protocols, and the advertisement transport protocol is one of the plurality of transport protocols, where the first node and the second node are nodes of a border gateway protocol (BGP) community, receiving, by the first node, from a requesting node a request to join the BGP community, where the request includes an attribute indicating a request transport protocol supported by the requesting node, allocating, by the first node and based on the attribute, a resource for the request transport protocol supported by the requesting node, and providing, by the first node, a notification to the second node indicating allocation of the resource for the request transport protocol.

In at least one other aspect, providing the notification to the second node includes sending the notification to a route reflector or a rendezvous point.

In at least one other aspect, the method may also include sending, by the first node through a third node supporting the request transport protocol supported by the requesting node, the resource to the requesting node.

In at least one other aspect, the second node does not support the request transport protocol supported by the requesting node.

In at least one other aspect, the second node supports a second plurality of transport protocols.

In at least one other aspect, the second node is configured to receive a communication by a first transport protocol from the first node and send a second communication by a second transport protocol to the requesting node.

In at least one other aspect, the second communication is the communication translated to be sent over the second transport protocol.

In at least one other aspect, the resource is a website configured to be multicasted by the first node.

In at least one aspect, one or more non-transitory computer-readable media includes computer-readable instructions stored thereon, where the computer-readable instructions, when executed by one or more processors, cause the one or more processors to receive, by a first node from a second node, an advertisement indicating an advertisement transport protocol supported by the second node, where the first node supports a plurality of transport protocols, and the advertisement transport protocol is one of the plurality of transport protocols, where the first node and the second node are nodes of a border gateway protocol (BGP) community, receive, by the first node, from a requesting node a request to join the BGP community, where the request includes an attribute indicating a request transport protocol supported by the requesting node, allocate, by the first node and based on the attribute, a resource for the request transport protocol supported by the requesting node, and provide, by the first node, a notification to the second node indicating allocation of the resource for the request transport protocol.

In at least one aspect, a system includes one or more processors. The system also includes one or more memories configured to store computer-readable instructions thereon, which when executed by the one or more processors, cause the one or more processors to receive, by a first node from a second node, an advertisement indicating an advertisement transport protocol supported by the second node, where the first node supports a plurality of transport protocols, and the advertisement transport protocol is one of the plurality of transport protocols, where the first node and the second node are nodes of a border gateway protocol (BGP) community, receive, by the first node, from a requesting node a request to join the BGP community, where the request includes an attribute indicating a request transport protocol supported by the requesting node, allocate, by the first node and based on the attribute, a resource for the request transport protocol supported by the requesting node, and provide, by the first node, a notification to the second node indicating allocation of the resource for the request transport protocol.

DESCRIPTION

Historically, networks mainly utilized one transport protocol for multicasting and unicasting. For example, Generic Routing Encapsulation (GRE) was mainly used for decades. Current networks want to migrate their networks from one transport to another to leverage the benefits of newer technology. As network providers perform upgrade cycles, these network providers would like to not only upgrade hardware, but also deploy newer technology for unicast and multicast options. Network providers are adding new segments and/or upgrading portions of their networks to adopt newer protocols with better convergence options and other benefits. However, migrating the network across different technologies is challenging.

Previously, GRE was the primary choice for deployment by multicast providers. This was later changed with MLDP and P2MP-TE availability, due to better convergence options. However, such migration happened only from GRE to MLDP and/or P2MP-TE. In other words, the migration was from one protocol to two.

Many network providers are adding new segments and/or upgrading portions of their network. New and/or upgraded segments can utilize various different multicast options, such as Tree-SID and/or SRv6. The network providers will need to migrate from a wide variety of multicast options to all of the other multicast options. A migration can be exponentially larger than the previous migration because the subsequent migration would be from numerous protocols to numerous protocols.

Current multicast procedures do not have mechanisms for both new and old transports to work together. Some networks and even some parts of some networks may utilize different transport protocols, which can cause inefficiencies.

For example, if a part of a network is migrated to segment routing v6 (SRv6) and another part is still operating with multiprotocol label switching (MPLS) ingress replication (IR), existing methods will generate only one inclusive (I) provider multicast service interface (PMSI) (I-PMSI) and multi-directional (MS)-PMSI with one PMSI tunnel attribute (PTA). That PTA can be either IR (MPLS) or IR (SRv6). The network will only be able to multicast across one transport protocol, leaving the remainder of the network unused.

The disclosed technology addresses the need in the art for efficient multicast transport migration procedures. The systems and methods disclosed can automatically discover multiple supported PTAs on various nodes in a network and handle multicast transports across the various nodes using the variety of different protocols supported by the various nodes.

Each node is configured to advertise the I-PMSI with multiple PTAs (e.g., with the transport protocols that the node supports) to the other nodes and/or a route reflector. Shared transport protocols can be determined from the advertisements. Routing between nodes can then be determined using the shared transport protocols and supported protocols.

Communications between each node can be performed through one or more shared protocols. For example, a first node can support one or more transport protocols and a second node can support a plurality of transport protocols, at least one of which is common with the one or more transport protocols of the first node. The first node can then provide a resource using the common protocol to the second node. In some embodiments, the nodes can be configured to translate communications between the protocols supported by the node. The node can then provide the communication to another node using a different protocol. For example, a first node may be configured to support both SRv6 and GRE, but the second node is only configured to support SRv6. The second node can requests a resource from a source node that is configured to support GRE. The first node can receive the resource from the source node using GRE, translate the communication, and provide the resource to the second node using SRv6.

Network providers are able to utilize different hardware and transport protocols together. This enables network providers to upgrade the hardware and technology in distinct phases without interrupting operation of services during the upgrades. Additionally, network providers are able to leverage the entirety of their network by utilizing gateways to translate between different transport protocols and provide resources that were spread across previously incompatible transport protocols.

Additional features and advantages of the disclosure are set forth in the description which follows, and in part are obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
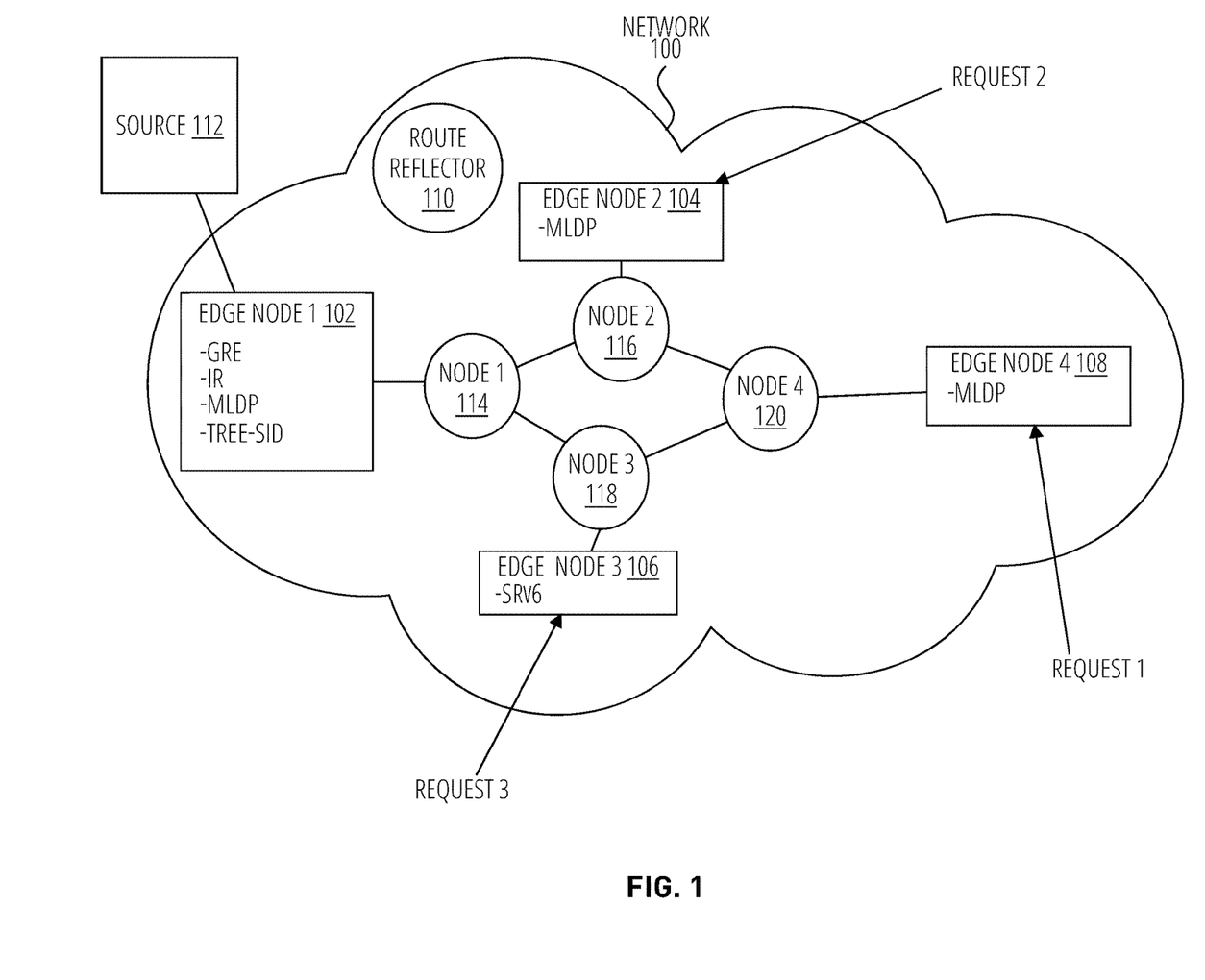
FIG. 1 illustrates an example network in accordance with some aspects of the present technology.

FIG. 1 illustrates an example network 100 comprising multiple edge nodes 102, 104, 106, 108, a route reflector 110 configured to communicate with edge nodes 102-108, and a source 112 for a resource. The network 100 can be a border gateway protocol (BGP) network or a portion thereof.

The edge nodes 102-108 are provider edges in network 100. Each edge node 102-108 is configured to support one or more transport protocols. For example, edge node 1 102 supports GRE, IR, MLDP, and Tree-SID SRv6. Other nodes can support one or more transport protocols. For example, edge node 2 104 and edge node 4 108 both support MLDP. Additionally some nodes can support one or more different transport protocols. For example, edge node 3 106 supports SRv6.

The edge nodes 102-108 are configured to advertise transport protocols that the node supports. The advertisement can be enhanced to indicate multiple transport protocols. For example, each edge node 102-108 can advertise I-PMSIs with PTAs for a plurality of transport protocols that the nodes support. For example, edge node 1 102 can advertise a I-PMSI with PTAs identifying GRE, IR, MLDP, and Tree-SID SRv6.

Route reflector 110 is configured to receive the advertisements and determine which transport protocols each edge node 102-108 supports. Similarly, route reflector 110 receives advertisements from intermediate nodes 114, 116, 118, 120. The route reflector 110 can be configured to perform best path calculations and forward the best paths to a resource to neighboring BGP communities. Additionally, route reflector 110 is configured to communicate with edge nodes 102-108 to send and receive communications associated with requests.

Edge node 102 is illustrated to be in communication with a source 112. Source 112 is a source node that stores and provides a resource to be multicasted. For example, the resource can be a website that is configured to be provided to multiple end users requesting access or otherwise interacting with the website.

The edge nodes 102-108 can receive requests from outside of the BGP network 100 or community. Additionally, the edge nodes 102-108 are configured to communicate with the route reflector 110 to process requests and provide resources therethrough.

For example, edge node 4 108 can receive (e.g., via a multicast virtual private network enabled interface) a first protocol independent multicast (PIM) and/or internet group management protocol (IGMP) request (e.g., request 1 in FIG. 1) to join the BGP network 100 and access the resource of source 112. As illustrated, the source 112 is accessible through edge node 1 102. Edge node 4 108 can send a join request indicating the source 112 and a particular multicast group IP address. The join request can be represented by (S,G), where S refers to the unicast IP address of the source for the multicast traffic, and the G refers to the particular multicast group IP address for which S is the source. For example, node 4 108 can send a (S,G) join request with MLDP added as a path attribute to the route reflector 110.

The route reflector 110 can send the (S,G) join request towards node 1 102. After node 1 102 receives the join request, node 1 102 can allocate the resource for the (S,G) data multicast distribution tree (MDT) based on the path attribute received with the join request, which in this example is for MLDP based transport.

Node 1 102 can update the route reflector 110 that the resource has been allocated for MLDP transport by sending an advertisement (e.g., a Type 3 advertisement) identifying MLDP transport to the route reflector 110.

The route reflector 110 can reflect the changes to the nodes 104-108 and other BGP neighbors, so that the nodes 104-108 and the other neighbors are aware of the updated resource allocation for MLDP transport. Nodes supporting this information (e.g., node 2 104 and node 4 108) can store this information. Such nodes can store this information even if they do not have active requests for the resource. In some embodiments, nodes that do not support the transport can choose to ignore or store the updated transport information.

Node 4 108 can send an underlay join for the MLDP transport to join the MDT for MLDP. A tree is formed from edge node 4 108 towards edge node 1 102 via node 4 120 to node 2 116 to node 1 114 to edge node 1 102. Once the MLDP tree is formed, traffic can flow on the tree towards edge node 4 108.

As another example, edge node 2 104 can also receive a PIM/IGMP (S,G) join request (e.g., request 2 in FIG. 1) identifying MLDP as a path attribute. The source 112 is reachable through edge node 1 102. Edge node 2 104 can send the (S,G) join with MLDP as an add path attribute to the route reflector 110. In some examples, the route reflector 110 has already received the same join request from edge node 4 108 and the route reflector 110 can indicate that the resource is already allocated for MLDP. For example, edge node 2 104 can have previously received and stored the transport information when route reflector 110 reflected the allocation of the resource for MLDP above. Edge node 2 104 can send an underlay join request for the MLDP transport to join the MDT for MLDP. Accordingly, once the MLDP tree is formed, traffic can start flowing on the tree towards edge node 2 104.

As yet another example, edge node 3 106 can receive a PIM/IGMP (S,G) join request (e.g., request 3 in FIG. 1). Since the source 112 is accessible through edge node 1 102, edge node 3 106 sends the (S,G) join request with SRv6 as the add path attribute to the route reflector 110. The route reflector 110 sends the join request towards edge node 1 102 as this is a new path attribute. Edge node 1 102 allocates the resource for the (S,G) data MDT based on the path attribute received with the join request. In other words, edge node 1 102 allocates the resource for SRv6 based transport. The route reflector 110 updates the newly allocated resource to the other nodes and other BGP neighbors. Edge nodes can store this information even if they do not have active requests for this resource and other edge nodes that do not support this transport can choose to ignore or store the information. Edge node 3 106 can then send the Leaf A-D route to edge node 1 102. Once the tree is formed, traffic can flow on the tree towards edge node 3 106. Traffic can flow from edge node 1 102 to edge nodes 104, 108 via MLDP and to edge node 3 106 via SRv6 simultaneously. Edge node 1 102 can simultaneously use multiple transports protocols.

In some embodiments, the edge nodes 102-108 can be configured to act as gateways. The gateways can indicate to receiving edge nodes that advertising edge nodes are capable of handling listed transport protocol types and should be used for forming trees when an original source edge node does not support the transport type desired.

For example, edge node 4 108 may need to access a resource from a source behind edge node 3 106. However, edge node 4 108 cannot build a tree towards edge node 3 106 due to incompatible and/or different protocols.

When edge node 4 108 receives an advertisement from edge node 1 102 indicating that edge node 1 102 is acting as a gateway, edge node 4 108 can send a special join request towards edge node 1 102 indicating that this is a stitching join (for example, as an attribute), with the actual request for which it needs traffic. Edge node 1 102 can send a join towards edge node 3 106 with a compatible protocol (for example, SRv6) path attribute. Edge node 1 102 builds a tree towards edge node 3 106 using SRv6 and adds its own MLDP MDT as a forwarding interface.

Edge node 1 106 can have a state to receive traffic from the source behind edge node 3 106 through a SRv6 tunnel and send traffic onwards to edge node 4 108 using a MLDP tunnel. In other words, edge node 1 106 receives resources in one transport protocol, translates the communication, and sends the resources in a different transport protocol.

Figure 2:
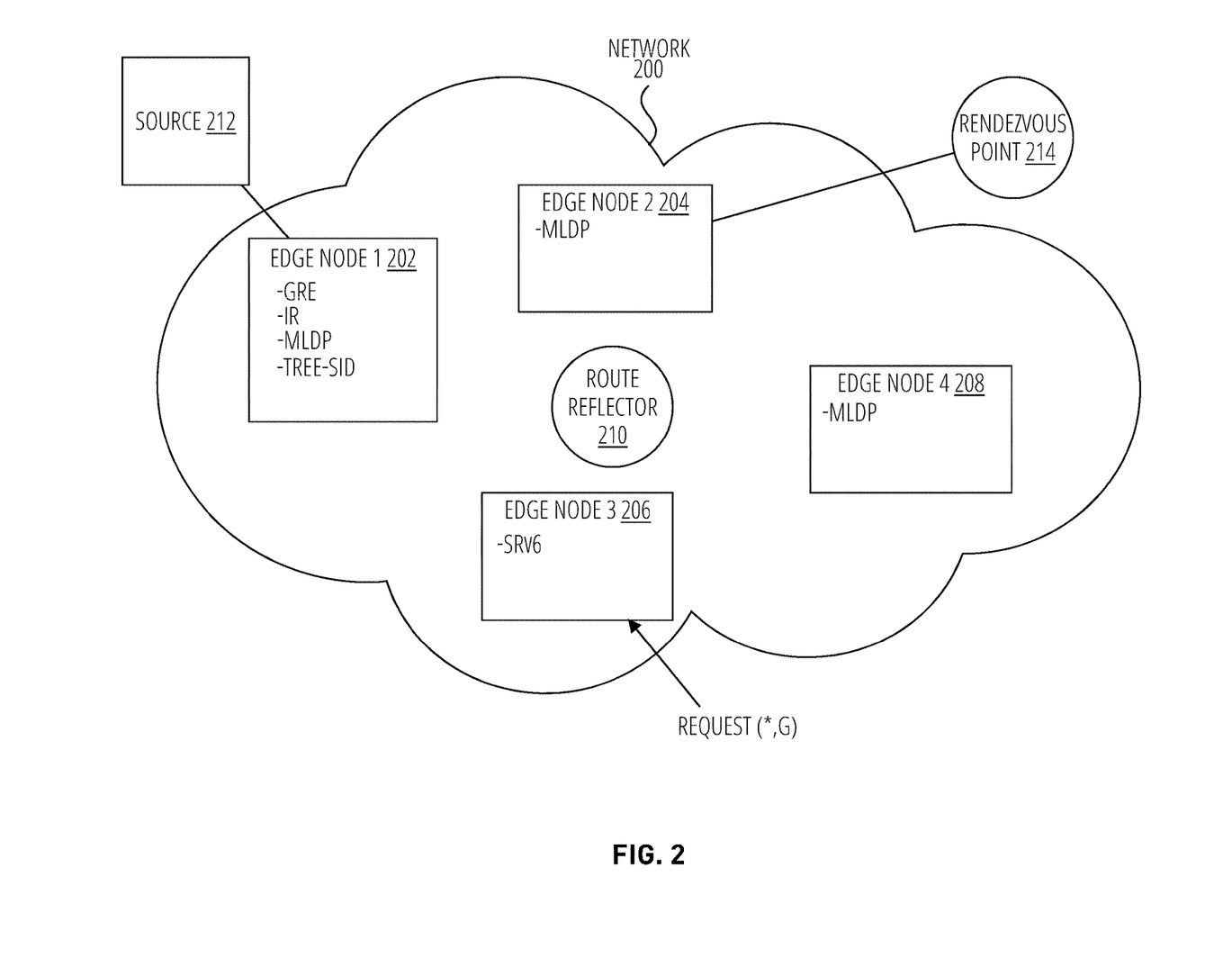
FIG. 2 illustrates an example network in accordance with some aspects of the present technology.

FIG. 2 illustrates a network 200 having edge nodes 202, 204, 206, 208, a route reflector 210, and a rendezvous point 214. Edge nodes 202-208 are provider edges, like the edge nodes 102-108 discussed above with respect to FIG. 1. Similarly, route reflector 210 can perform the operations of route reflector 110 discussed above with respect to FIG. 1.

In some examples, edge nodes 202-208 may not know where a source is for a particular resource. Similarly, sources 212 may not have and/or know of an active receiver or requestor when the source 212 begins producing traffic (e.g., resources). Rendezvous point 214 is configured to receive the resources and identify edge nodes 202-208 that support transport protocols and can transport the resources using the supported transport protocols.

Additionally, rendezvous point 214 is configured to receive requests from edge nodes 202-208. Some requests can be represented by (*,G), such that * indicates any source, and G refers to the particular multicast group IP address. For example, a receiver or requestor may desire to receive a resource and does not know where the source is.

Rendezvous point 214 can receive the any source request from edge nodes 202-208 and identify edge nodes 202-208 that transport the requested resource using an applicable transport protocol. For example, edge node 3 206 can receive a PIM/IGMP (*,G) request. Edge node 3 206 identifies that rendezvous point 214 is reachable through edge node 2 204 (e.g., via an announcement from route reflector 210). Edge node 3 206 can send a (*,G) join request, which identifies SRv6 as the add path attribute to the route reflector 210.

Rendezvous point 214 also forms a (S,G) tree towards source 212 using the same or similar steps as those discussed above with respect to FIG. 1. Rendezvous point 214 receives resources from source 212 through edge node 1 202 and edge node 2 204. However, rendezvous point 214 does not have a common transport protocol with any receiver edge nodes.

After the route reflector 210 receives the (*,G) join request, the route reflector 210 then sends the join request towards edge node 1 202. Edge node 1 202, can generate a Source Active route (e.g., Type-5 route) after receiving the join request and send the Source Active route to the route reflector 210. The route reflector 210 reflects the route to the edge nodes 202-208 and all other BGP neighbors.

Receiving edges (e.g., edge node 3 206) can join the source based tree with the transport that they support. For example, a receiver site for edge node 3 206 will originate a (S,G, SRv6) join request using the same or similar steps as those discussed above with respect to FIG. 1. In some embodiments, the join request can include multiple different transport protocol and/or identify a preferred transport protocol. In some embodiments, rendezvous point 214 can be available in a site where SRv6 is enabled to receive shared tree traffic. In some embodiments, rendezvous point 214 can support all transport protocols.

Figure 3:
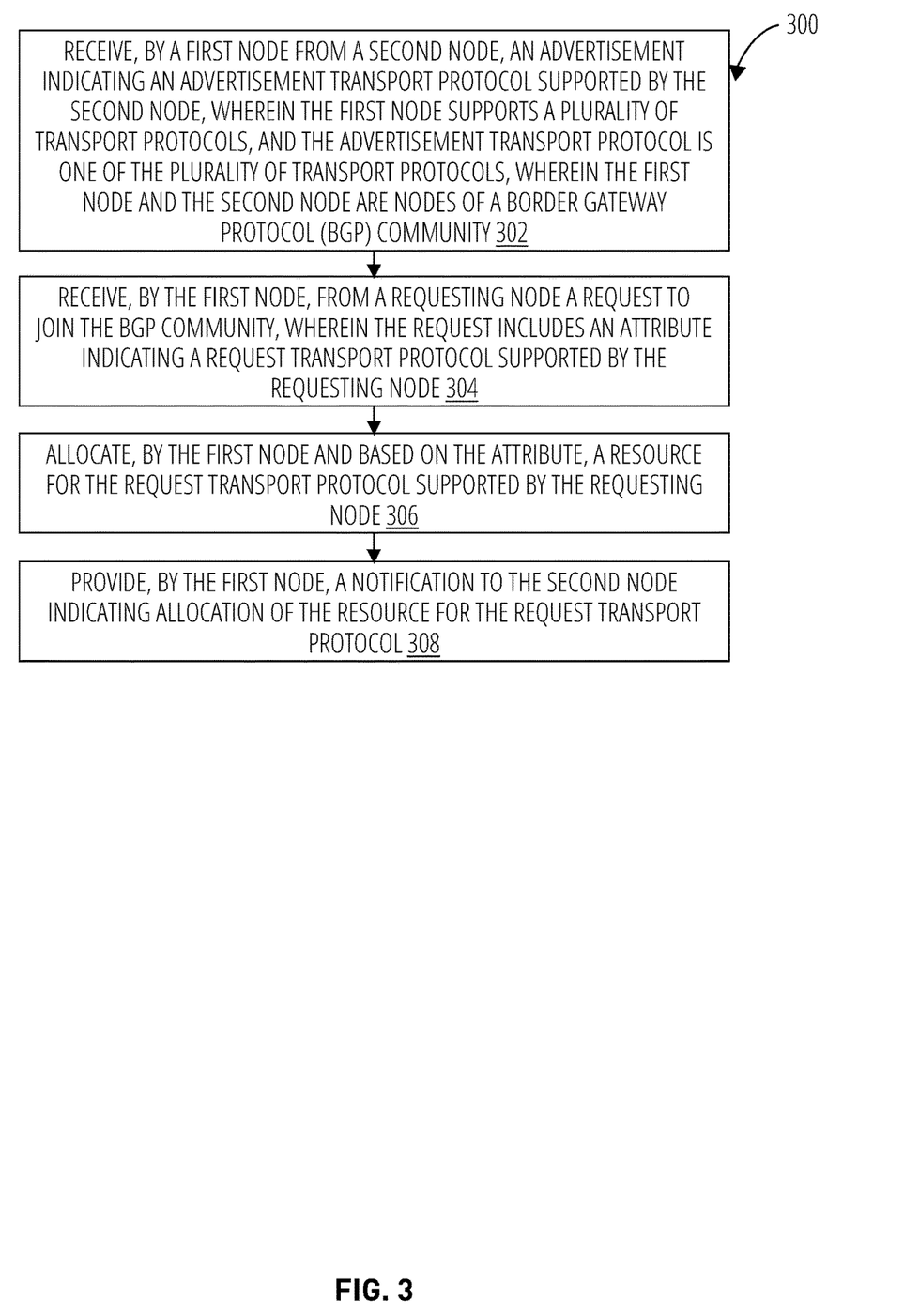
FIG. 3 illustrates a method for optimizing communications between nodes utilizing one or more different transport protocols in accordance with some aspects of the present technology.

FIG. 3 illustrates an example method 300 for optimizing communications between nodes utilizing one or more different transport protocols. Example method 300 can optimize and enable multicast transport migration procedures by enabling multiple transport protocols to operate together across a network. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

At step 302, method 300 includes receiving, by a first node from a second node, an advertisement indicating an advertisement transport protocol supported by the second node. The first node can support a plurality of transport protocols. The advertisement transport protocol can be one of the plurality of transport protocols. The first node and the second node can be nodes of a border gateway protocol (BGP) community. In some embodiments, the second node does not support the request transport protocol supported by the requesting node. In some embodiments, the second node supports a second plurality of transport protocols. In some embodiments, the second node is configured to receive a communication by a first transport protocol from the first node and send a second communication by a second transport protocol to the requesting node. In some embodiments, the second communication is the communication translated to be sent over the second transport protocol.

At step 304, method 300 includes receiving, by the first node, from a requesting node a request to join the BGP community. The request can include an attribute indicating a request transport protocol supported by the requesting node.

At step 306, method 300 includes allocating, by the first node and based on the attribute, a resource for the request transport protocol supported by the requesting node. In some embodiments, the resource is a website configured to be multicasted by the first node.

At step 308, method 300 includes providing, by the first node, a notification to the second node indicating allocation of the resource for the request transport protocol. In some embodiments, providing the notification to the second node includes sending the notification to a route reflector or a rendezvous point.

In some embodiments, method 300 can also include sending, by the first node through a third node supporting the request transport protocol supported by the requesting node, the resource to the requesting node.

Figure 4:
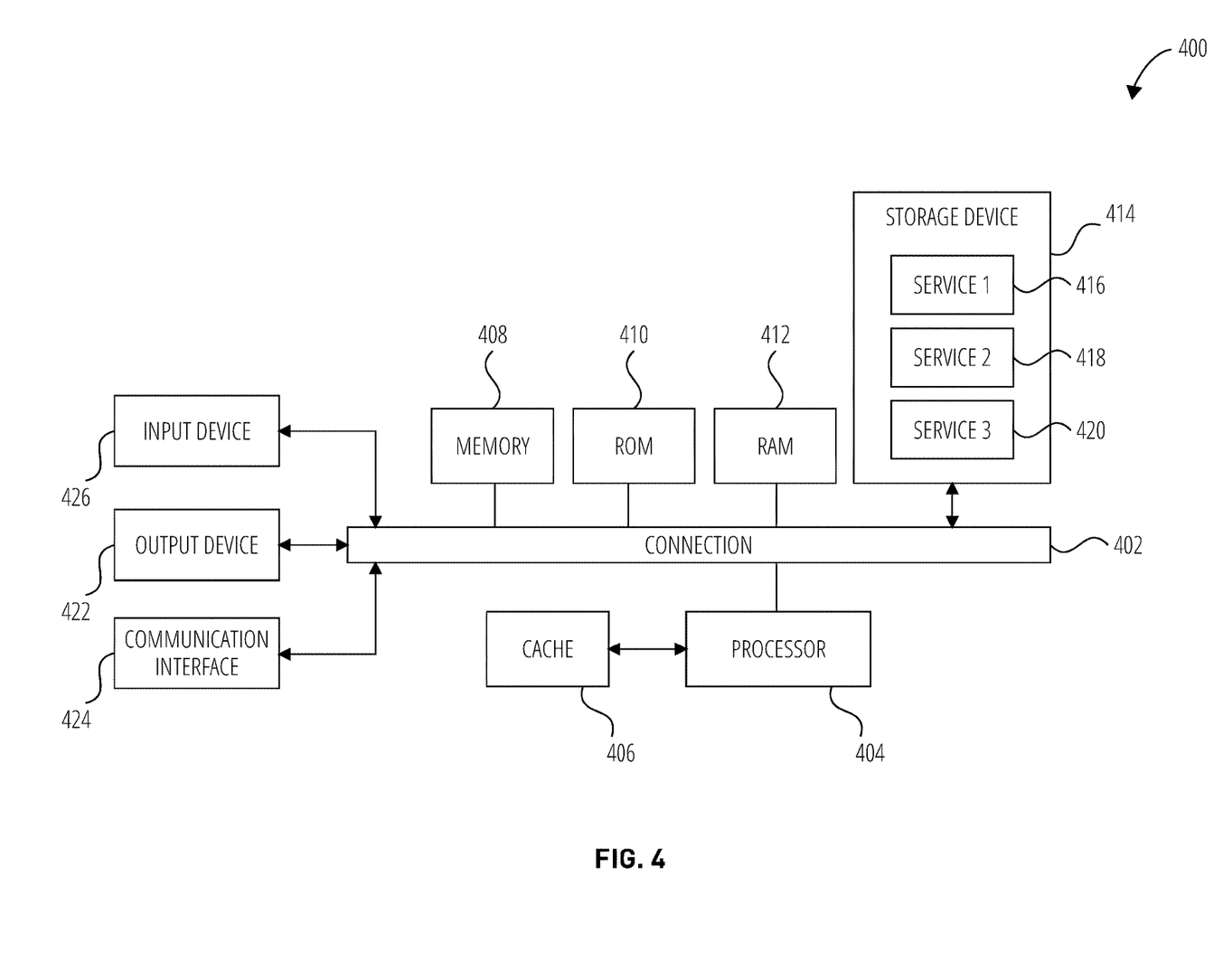
FIG. 4 shows an example of a system for implementing certain aspects of the present technology.

FIG. 4 shows an example of computing system 400, which can be for example any computing device making up network 100, edge nodes 102-108, route reflector 110, source 112, nodes 114-120, network 200, edge nodes 202-208, route reflector 210, source, rendezvous point 214, or any component thereof in which the components of the system are in communication with each other using connection 402. Connection 402 can be a physical connection via a bus, or a direct connection into processor 404, such as in a chipset architecture. Connection 402 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 400 includes at least one processing unit (CPU or processor) 404 and connection 402 that couples various system components including system memory 408, such as read-only memory (ROM) 410 and random access memory (RAM) 412 to processor 404. Computing system 400 can include a cache of high-speed memory 406 connected directly with, in close proximity to, or integrated as part of processor 404.

Processor 404 can include any general purpose processor and a hardware service or software service, such as services 416, 418, and 420 stored in storage device 414, configured to control processor 404 as well as a special-purpose processor where software instructions are incorporated into the actual processor design. Processor 404 may essentially be a completely self-contained computing system, containing multiple cores or processors, a bus, memory controller, cache, etc. A multi-core processor may be symmetric or asymmetric.

To enable user interaction, computing system 400 includes an input device 426, which can represent any number of input mechanisms, such as a microphone for speech, a touch-sensitive screen for gesture or graphical input, keyboard, mouse, motion input, speech, etc. Computing system 400 can also include output device 422, which can be one or more of a number of output mechanisms known to those of skill in the art. In some instances, multimodal systems can enable a user to provide multiple types of input/output to communicate with computing system 400. Computing system 400 can include communication interface 424, which can generally govern and manage the user input and system output. There is no restriction on operating on any particular hardware arrangement, and therefore the basic features here may easily be substituted for improved hardware or firmware arrangements as they are developed.

Storage device 414 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 414 can include software services, servers, services, etc., that when the code that defines such software is executed by the processor 404, it causes the system to perform a function. In some embodiments, a hardware service that performs a particular function can include the software component stored in a computer-readable medium in connection with the necessary hardware components, such as processor 404, connection 402, output device 422, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for optimizing communications between nodes, the method comprising:
   receiving, by a first node, an advertisement indicating an advertisement transport protocol supported by a second node, wherein the first node supports a plurality of transport protocols, and the advertisement transport protocol is one of the plurality of transport protocols, wherein the first node and the second node are edge nodes of a border gateway protocol (BGP) community;
   receiving, by the first node, from a requesting node through the second node a request to join the BGP community and access a resource, wherein the request includes an attribute indicating a request transport protocol supported by the requesting node, and wherein the first node and second node are part of the BGP community and the requesting node is not part of the BGP community;
   allocating, by the first node and based on the attribute, the resource for the request transport protocol supported by the requesting node;
   providing, by the first node, a notification to one or more intermediate nodes and the second node indicating allocation of the resource for the request transport protocol; and
   receiving, by the first node, an underlay join request for the request transport protocol enabling traffic to flow from the first node to the second node.

2. The method of claim 1, wherein providing the notification to the second node includes sending the notification to a route reflector or a rendezvous point.

3. The method of claim 1, further comprising:
   sending, by the first node through a third node supporting the request transport protocol supported by the requesting node, the resource to the requesting node.

4. The method of claim 1, wherein the second node does not support the request transport protocol supported by the requesting node.

5. The method of claim 1, wherein the second node supports a second plurality of transport protocols.

6. The method of claim 1, wherein the second node is configured to receive a communication by a first transport protocol from the first node and send a second communication by a second transport protocol to the requesting node.

7. The method of claim 6, wherein the second communication is the communication translated to be sent over the second transport protocol.

8. The method of claim 1, wherein the resource is a website configured to be multicasted by the first node.

9. One or more non-transitory computer-readable media comprising computer-readable instructions stored thereon, wherein the computer-readable instructions, when executed by one or more processors, cause the one or more processors to:
receive, by a first node, an advertisement indicating an advertisement transport protocol supported by a second node, wherein the first node supports a plurality of transport protocols, and the advertisement transport protocol is one of the plurality of transport protocols, wherein the first node and the second node are edge nodes of a border gateway protocol (BGP) community;
receive, by the first node, from a requesting node through the second node a request to join the BGP community and access a resource, wherein the request includes an attribute indicating a request transport protocol supported by the requesting node, and wherein the first node and second node are part of the BGP community and the requesting node is not part of the BGP community;
allocate, by the first node and based on the attribute, the resource for the request transport protocol supported by the requesting node;
provide, by the first node, a notification to one or more intermediate nodes and the second node indicating allocation of the resource for the request transport protocol; and
receiving, by the first node, an underlay join request for the request transport protocol enabling traffic to flow from the first node to the second node.

10. The one or more non-transitory computer-readable media of claim 9, wherein providing the notification to the second node includes sending the notification to a route reflector or a rendezvous point.

11. The one or more non-transitory computer-readable media of claim 9, wherein the execution of the computer-readable instructions, by the one or more processors, cause the one or more processors to:
send, by the first node through a third node supporting the request transport protocol supported by the requesting node, the resource to the requesting node.

12. The one or more non-transitory computer-readable media of claim 9, wherein the second node does not support the request transport protocol supported by the requesting node.

13. The one or more non-transitory computer-readable media of claim 9, wherein the second node supports a second plurality of transport protocols.

14. The one or more non-transitory computer-readable media of claim 9, wherein the second node is configured to receive a communication by a first transport protocol from the first node and send a second communication by a second transport protocol to the requesting node.

15. The one or more non-transitory computer-readable media of claim 14, wherein the second communication is the communication translated to be sent over the second transport protocol.

16. The one or more non-transitory computer-readable media of claim 9, wherein the resource is a website configured to be multicasted by the first node.

17. A system comprising:
one or more processors; and
one or more memories configured to store computer-readable instructions thereon, which when executed by the one or more processors, cause the one or more processors to:
receive, by a first node, an advertisement indicating an advertisement transport protocol supported by a second node, wherein the first node supports a plurality of transport protocols, and the advertisement transport protocol is one of the plurality of transport protocols, wherein the first node and the second node are edge nodes of a border gateway protocol (BGP) community;
receive, by the first node, from a requesting node through the second node a request to join the BGP community and access a resource, wherein the request includes an attribute indicating a request transport protocol supported by the requesting node, and wherein the first node and second node are part of the BGP community and the requesting node is not part of the BGP community;
allocate, by the first node and based on the attribute, the resource for the request transport protocol supported by the requesting node;
provide, by the first node, a notification to one or more intermediate nodes and the second node indicating allocation of the resource for the request transport protocol; and
receive, by the first node, an underlay join request for the request transport protocol enabling traffic to flow from the first node to the second node.

18. The system of claim 17, wherein providing the notification to the second node includes sending the notification to a route reflector or a rendezvous point.

19. The system of claim 17, wherein the one or more processors are configured to execute the computer-readable instructions to:
send, by the first node through a third node supporting the request transport protocol supported by the requesting node, the resource to the requesting node.

20. The system of claim 17, wherein the second node does not support the request transport protocol supported by the requesting node.

* * * * *